(12) United States Patent
Orcutt et al.

(10) Patent No.: US 6,217,082 B1
(45) Date of Patent: Apr. 17, 2001

(54) SWIVEL FITTING

(75) Inventors: Eric D. Orcutt, Rockvale; Dean D. Fritz, Murfreesboro, both of TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/392,727

(22) Filed: Sep. 9, 1999

(51) Int. Cl.⁷ .................................................. F16L 27/00
(52) U.S. Cl. ...................... 285/272; 285/281; 285/382.4; 285/258
(58) Field of Search .................................. 285/278, 281, 285/280, 282.4, 258, 272

(56) References Cited

U.S. PATENT DOCUMENTS

| | | | |
|---|---|---|---|
| 175,232 | * 3/1876 | Work et al. | 285/258 |
| 379,749 | * 3/1888 | Wilson | 285/382.4 |
| 793,209 | * 6/1905 | Miller | 285/280 |
| 1,001,842 | * 8/1911 | Greenfield | 285/382.4 |
| 1,299,371 | * 4/1919 | Meloon | 285/382.4 |
| 1,610,165 | * 12/1926 | Schellin | 285/280 |
| 2,216,839 | * 10/1940 | Hoffman | 285/258 |
| 2,228,018 | * 1/1941 | Scholtes | 285/258 |
| 2,433,425 | * 12/1947 | Burckle | 285/258 |
| 2,543,087 | 2/1951 | Woodling . | |
| 2,543,088 | 2/1951 | Woodling . | |
| 2,570,406 | 10/1951 | Troshkin et al. . | |
| 2,574,625 | * 11/1951 | Coss | 285/281 |
| 3,367,681 | 2/1968 | Braukman . | |
| 4,068,867 | 1/1978 | Rodgers et al. . | |
| 4,128,264 | 12/1978 | Oldford . | |
| 5,478,122 | 12/1995 | Seabra . | |

FOREIGN PATENT DOCUMENTS

| | | | |
|---|---|---|---|
| 480827 | * 3/1938 | (GB) | 285/382.4 |
| 2145490 | * 3/1985 | (GB) | 285/382.4 |

* cited by examiner

Primary Examiner—Eric K. Nicholson
(74) Attorney, Agent, or Firm—Millen, White, Zelano & Branigan, P.C.

(57) ABSTRACT

A swivel fitting includes a first annular member and a second annular member. The first annular member has a second end which is threaded and a first end which receives the first end of the second annular member. The second annular member has a second end which is received within a tube or hose. The members are coupled together by expanding a frusto-conical end section of the second annular member within the first annular member, so that a radial lip on the frusto-conical section seats within an annular grove formed within the first annular member. The swivel fitting is sealed with an O-ring which is sandwiched between the radially extending stop on the first annular member and a shoulder on the second annular member.

13 Claims, 2 Drawing Sheets

SWIVEL FITTING

FIELD OF THE INVENTION

The present invention is directed to swivel fittings, and more particularly the present invention is directed to swivel fittings for connecting tubular members.

BACKGROUND OF THE INVENTION

Devices such as automotive vehicles, pneumatic machines and hydraulic machines utilize swivel fittings for connecting hoses and tubes between various components of these vehicles and machines. Thus, every year tens of millions of swivel connections are fabricated. As with any other component, it is advantageous to reduce cost, weight and size wherever possible, and it is further advantageous even in machines to improve esthetics to enhance the sale ability of the machines.

It is, of course, also necessary to maintain a reliability of swivel connections while reducing cost, size and weight, while improving appearance. Maintaining and enhancing the reliability involves not only providing a connection which is initially reliable so that the connection passes quality control, but also a connection which remain reliable over the life of the vehicle or machine with which it is used. Exemplary of a market which is of interest with respect to swivel fittings is the market for truck air brakes, trailer air brakes, and other light air/pneumatic systems that require a fitting to turn during installation. Such fittings must have diameters large enough to meet customer specifications and federal regulations while having an external diameter and axial extent which are preferably minimized.

SUMMARY OF THE INVENTION

In view of the aforementioned considerations, it is a feature of the present invention to provide a new and improved swivel connection useful for coupling passages through devices such as, but not limited to, air hoses.

In view of this feature, and other features, a swivel coupling comprises a first annular member and a second annular member. The first annular member has a first end portion and a second end portion, with the first end portion having a collar defining a cylindrical, axially extending inner wall surface. Adjacent to and inboard of the inner wall surface is a first radially extending shoulder. Spaced from the first radially extending shoulder by a cylindrical surface having a diameter less than the axially extending inner wall surface, is a second radially extending shoulder. The second annular member has a first end and a second end with a radially extending stop shoulder disposed therebetween. The first end of the second annular member cooperates with the first end of the first member and retains the second annular member within the first member. This retention is accomplished by first end of the second member initially comprising a radially deformable frusto-conical section having a radially extending lip thereon, which frusto-conical section is inserted into the first end of the first annular member. A frusto-conical section is then expanded radially to position the radially extending lip of the frusto-conical section behind the second radially extending shoulder of the first annular member. A seal is positioned between the radially extending stop to seal the radially extending stop and first shoulder of the first annular member.

In a further aspect of the invention, the second end of the first annular member is threaded, and the second end of the second annular member is configured as an insert for receipt into a hose or tube.

In further aspects of the invention, the swivel coupling is made of metal, and the annular seal is in the form of an O-ring slipped over the first end of the second annular member.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
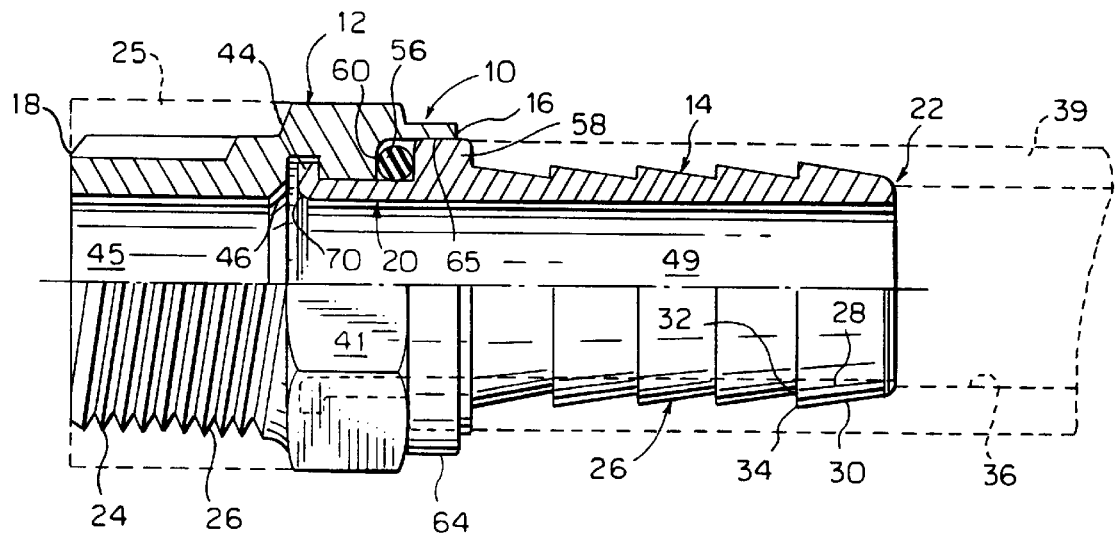
FIG. 1 is a side view, partially in elevation showing swivel connector configured in accordance with the principles of the present invention with two annular members coupled to one another.

Referring now to FIG. 1, there is shown a swivel connection 10 configured in accordance with the principles of the present invention, wherein first annular member 12 is coupled to a second annular member 14. The first annular member 12 has a first end portion 16 and a second end portion 18. The first end portion 16 receives a first end 20 of the second annular member 14, while the second end portion 22 of the second annular member 14 projects from the first annular member. The second annular member 14 is circular over the complete length thereof because it does not include a hex-nut portion.

The second end portion 18 of the first annular member has a helical thread 24 thereon for threading into another fitting 25 or into a device such as a valve (not shown) while the second end portion 22 of the second annular member 14 has a barbed outer surface 26 with a plurality of barbs 28, each barb having a ramp portion 30 and a shoulder 32 which intersect to form an annular edge 34. The annular edge 34 bites into the inner wall 36 of a tube or hose 39 (shown in dotted lines). When installing the hose or tube 39 onto the swivel connection 10, it is necessary to allow the tube or hose 39 to swivel with respect to the first annular member 12. This is because a first annular member 12 must be rotated about its axis in order to thread the end 24 into the fitting 25. The first annular member 12 has a series of flats 41 thereon, which provide a hexnut surface to facilitate gripping of the first annular member with a wrench. Thus, the first annular member 12, in the illustrated embodiment, is also known as a hex coupling.

Figure 2:
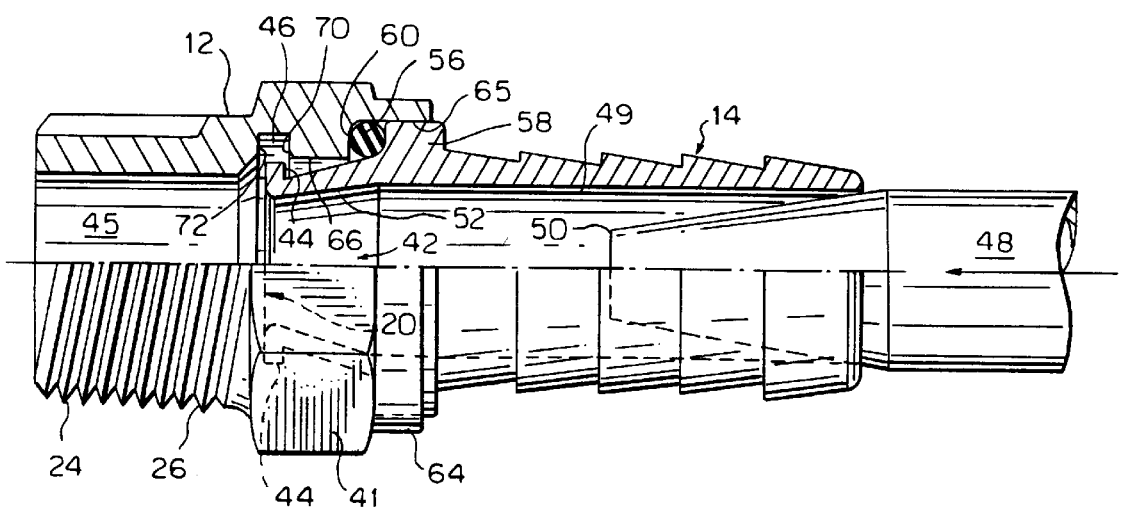
FIG. 2 is a view similar to FIG. 1 but showing one of the annular members inserted into the other but not coupled.
Figure 4:
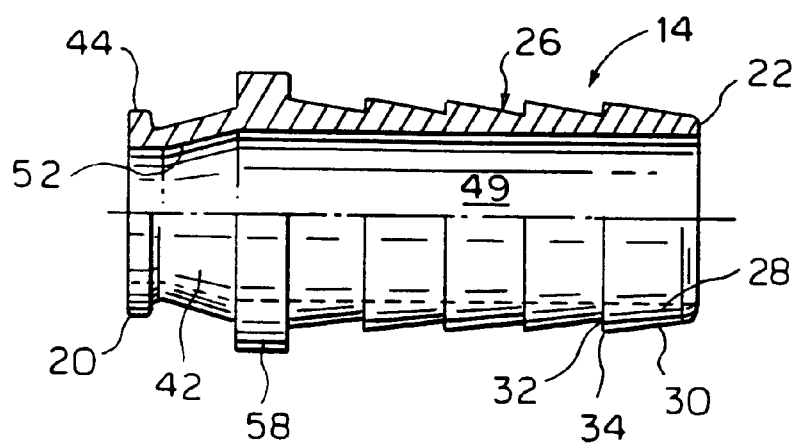
FIG. 4 is a side view, partially in elevation of a second annular member, which cooperates with the first annular member to provide the swivel connection of FIG. 1.
Figure 5:
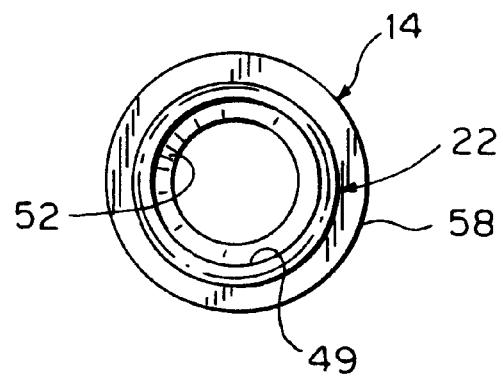
FIG. 5 is an end view of second annular member.

Referring now mainly to FIG. 2, where the assembly of the second annular member 14 to the first annular member 12 is shown. As is seen in FIGS. 2 and 4, the second annular member initially has a frusto-conical section 42 of a decreasing diameter, which frusto-conical surface terminates in a radially extending annular lip 44. After inserting the first end 20 of the second annular member 14 into a bore 45 of the first annular member 12, the frusto-conical section 42 is expanded by inserting a mandrel 48 through the bore 49 of the second annular member 14. The mandrel 48 has a frusto-conical surface 50 which engages an inner surface 52 on the frusto-conical section 42, and expands the frusto-conical section 42 outwardly. This moves the lip 44 into the radially extending slot 46 to retain the second annular member 14 coupled to the first annular member 12 as is seen in FIG. 1.

In order to mechanically seal the swivel fitting 10, an O-ring 56 is disposed between a radially extending stop shoulder 58 on the second annular member 14, and a first inwardly extending, axially facing abutment surface 60 on a first radial shoulder 61 of the first annular member 12 at the first end portion 16 of the first annular member. The radial stop 58 is disposed within a collar 64 at the first end 18 of the first annular member 12, which collar 64 has a selected inner diameter defines a cylindrical axially extending inner wall surface 65 that complements the outer diameter of the radially extending stop 58.

Between the axially extending slot 46 and the first radially extending shoulder 60, there is a second cylindrical surface 66 which has diameter less than the diameter defined by the annular lip 44 when the frusto-conical portion 42 is not expanded as is seen in FIG. 2. This allows the first end 20 to move into the bore 39 so that the annular lip 44 is received within the grove 46.

Figure 3:
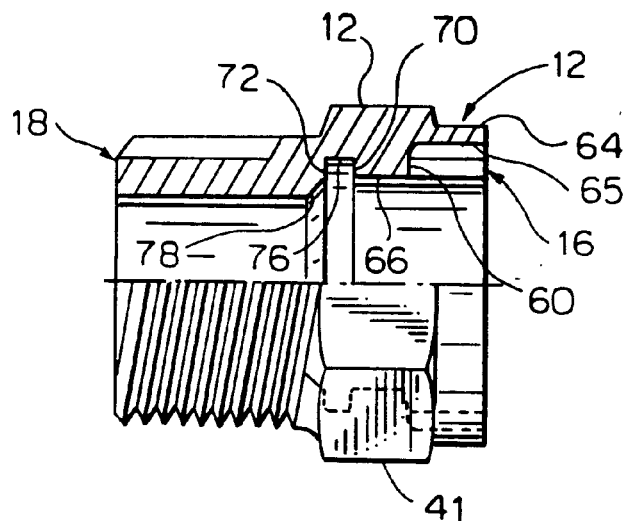
FIG. 3 is a side view, partially in elevation of a first annular member used in FIGS. 1 and 2.

As is seen in FIG. 3, groove 46 is defined by a second shoulder 70, and a wall 72 spaced from and positioned opposite the second shoulder 70 by radially extending slot 46. The wall 72 includes a frusto-conical beveled portion 78 which helps provide clearance when the frusto-conical section 42 (FIGS. 2 and 4) is deformed outwardly so that the bore 49 of the second annular member has a substantially constant diameter which matches the diameter of the bore 48 of the first annular member 12. The diameter of the cylindrical face is, of course, slightly greater than the outer diameter of the expanded portion 42, so that there is no substantial frictional force binding the second annular member 14 to the first annular member 12. Thus there is relative rotation permitted between the first and second annular members 12 and 14 which permits the fitting 10 to be attached to the bore of the fitting or component 25 without rotating the tube 39 fixed to the second annular fitting 14.

By placing the O-ring 56 under slight compression, the radial lip 44 is biased against the shoulder 70 with a fairly light force in the axial direction, so as not to interfere with the rotation or swiveling of the first and second annular members, one with respect to the other.

From the foregoing description, one skilled in the art can easily ascertain the essential characteristics of this invention and, without departing from the spirit and scope thereof, can make various changes and modifications of the invention to adapt it to various usages and conditions.

Upon further study of the specification and appended claims, further objects and advantages of this invention will become apparent to those skilled in the art.

What is claimed is:

1. A swivel coupling for transporting fluids comprising:
   a first annular member, the first annular member having a first end portion and a second end portion, the first end portion having a collar defining a cylindrical, axially extending inner wall surface;
   a first radial shoulder extending inwardly adjacent the cylindrical, axially extending inner wall surface; the first radial shoulder having a first axially facing abutment surface extending radially with respect to the cylindrical, axially extending inner wall surface;
   a second radially extending shoulder axially spaced from the first radial shoulder by a second cylindrical surface having a diameter less than the diameter of the cylindrical axially extending inner wall surface;
   a second annular member having a circular cross-section over the complete length thereof and having a first end portion and a second end portion with a radially extending stop shoulder therebetween; the first end portion of the second annular member cooperating with the first end portion of the first member, and the second end portion of the second annular member having an array of annular barbs thereon adapted to retain a tube, wherein the first end portion of the second member initially comprises a radially deformable frusto-conical section of a decreasing diameter which is less than the diameter of the second cylindrical surface, the frusto-conical section having a radially extending lip which also has an external second diameter less than the diameter of the cylindrical; wherein upon insertion of the first end portion of the second member into the first end portion of the first member, the radially extending lip locates proximate the second shoulder in radial and axial spaced relation thereto, and
   an annular seal around the second annular member and in contact therewith, the annular seal being disposed between the radially extending stop shoulder on the second annular member and the first axially facing abutment surface on the second annular member, whereby the second annular member is rotatably coupled with the first member upon inserting the first end portion of the second annular member into the first end portion of the first annular member and radially expanding the frusto-conical section of the second annular member.

2. The swivel coupling of claim 1, wherein the annular seal is an O-ring.

3. The swivel coupling of claim 2, wherein a second radially extending shoulder is disposed in a radially extending slot behind the second cylindrical surface.

4. The swivel coupling of claim 3, wherein the second end portion of the first annular member is threaded.

5. The swivel coupling of claim 4, wherein the first annular member includes flats thereon to provide griping surfaces for rotating the first annular member to thread the first annular member into another member.

6. The swivel coupling of claim 5, wherein the first and second annular members are made of metal.

7. The swivel coupling of claim 3, wherein the radially extending slot has a wall opposite the second shoulder, the wall of the slot having a beveled portion providing clearance for the radially extending lip upon expanding the frusto-conical section to position the lip behind the second shoulder.

8. The swivel coupling of claim 1, wherein the second end of the second annular member has a retainer thereon for securing a tube or hose thereto.

9. The swivel coupling of claim 8, wherein the retainer comprises an array of annular barbs adapted for receipt in the tube or hose.

10. The swivel coupling of claim 9, wherein the annular seal is an O-ring.

11. The swivel coupling of claim 10, wherein the first and second annular members are made of metal.

12. The swivel coupling of claim 1, wherein the first and second annular members are made of metal.

13. The swivel coupling of claim 1 wherein the second annular member has a diameter over the complete length thereof which is less than that of the diameter of the cylindrical axially extending inner wall surface.

* * * * *